Figure 1:
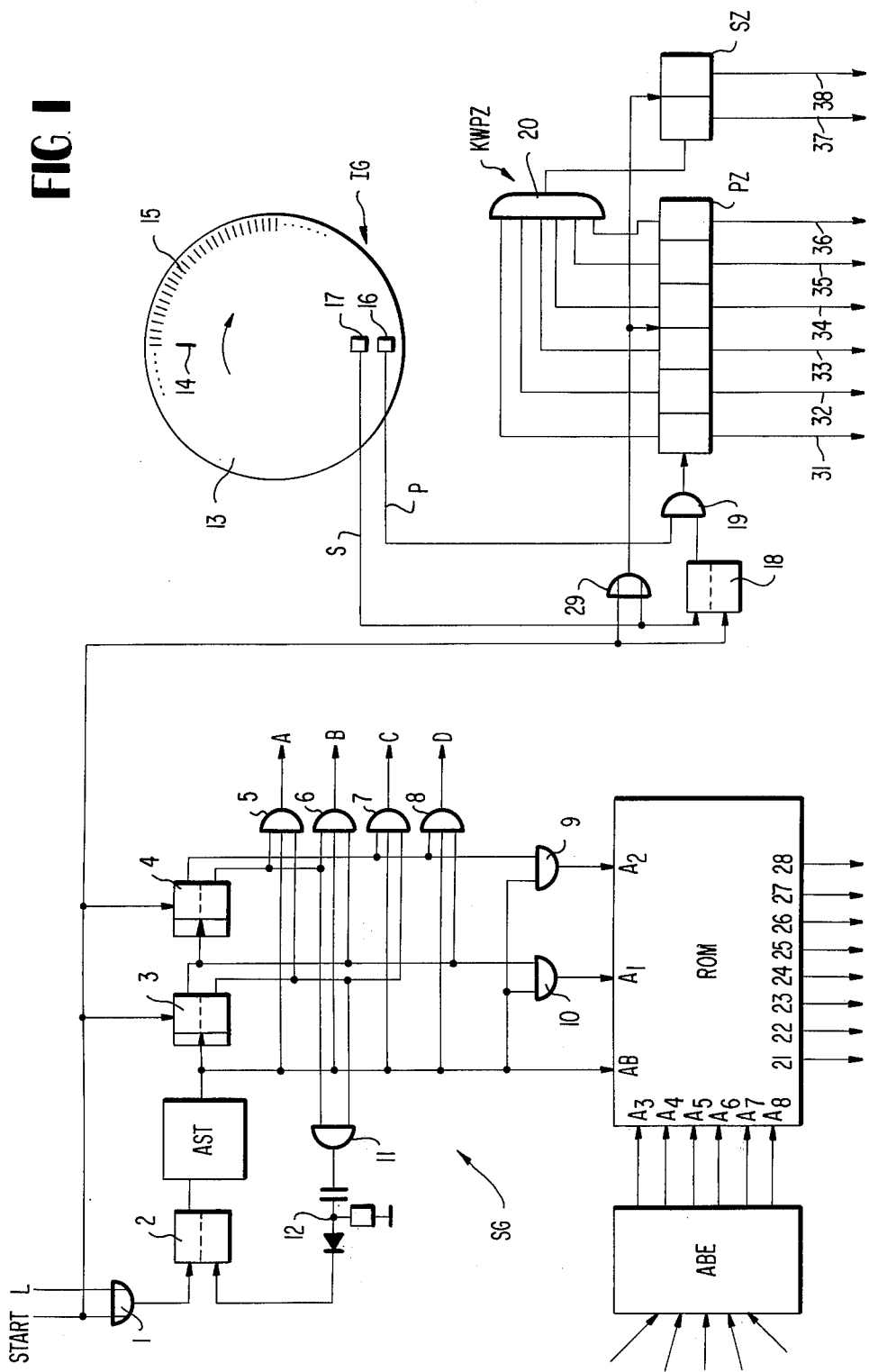

United States Patent [19]
Zelenka

[11] 3,935,846
[45] Feb. 3, 1976

[54] INSTALLATION FOR THE DIGITAL-ELECTRONIC CONTROL OF INLET, EXHAUSTION AND INJECTION VALVES AS WELL AS OF THE INJECTION IN INTERNAL COMBUSTION ENGINES

[75] Inventor: Hermann Zelenka, Bernhausen, Germany

[73] Assignee: Daimler-Benz Aktiengesellschaft, Germany

[22] Filed: Sept. 3, 1974

[21] Appl. No.: 502,905

[30] Foreign Application Priority Data
Aug. 31, 1973 Germany............................ 2343905

[52] U.S. Cl......................... 123/117 R; 123/32 EA
[51] Int. Cl.².......................................... F02P 3/02
[58] Field of Search................... 123/32 EA, 117 R

[56] References Cited
UNITED STATES PATENTS

| | | | |
|---|---|---|---|
| 3,454,871 | 7/1969 | Nolting............................ | 123/117 R |
| 3,689,753 | 9/1972 | Williams et al................. | 123/32 EA |
| 3,738,339 | 6/1973 | Huntzwger et al.............. | 123/117 R |
| 3,749,073 | 7/1973 | Asplund........................... | 123/117 R |
| 3,752,139 | 8/1973 | Asplund........................... | 123/117 R |
| 3,757,755 | 9/1973 | Carner............................. | 123/117 R |
| 3,834,362 | 9/1974 | Takeshita et al................ | 123/32 EA |
| 3,835,821 | 9/1974 | Hill et al.......................... | 123/32 EA |
| 3,838,397 | 9/1974 | Watson et al. .................. | 123/32 EA |
| 3,862,404 | 1/1975 | Fiedrich ......................... | 123/32 EA |

Primary Examiner—Wendell E. Burns
Assistant Examiner—Joseph Cangelosi
Attorney, Agent, or Firm—Craig & Antonelli

[57] ABSTRACT

A system for the digital-electronic control of the inlet, exhaust and possibly injection valves as well as of the ignition of internal combustion engines, especially of motor vehicle internal combustion engines, in which the valves are electromagnetically actuated and the respective crankshaft position is adapted to be detected digitally; a fixed value memory or storage device is provided in which at least for one cylinder the opening and closing instants of the inlet, exhaust, and possibly of the injection valves and/or of the ignition instants are at least partly adapted to be stored and selected as digital values coordinated to the respective operating conditions and corresponding to a predetermined crankshaft position in the form of data sets; a storage register is provided for each stored value of a data set to which this stored value is adapted to be transferred; a pulse comparison unit is also provided for each value of a data set in which the value either stored in the storage register or fixedly predetermined is adapted to be compared with the respective crankshaft position and from which, in case of agreement of the two values, a commencing pulse is adapted to be produced; a follower pulse generator is additionally provided at least for each value of a data set in which, beginning and together with the commencing pulse, a number of pulses corresponding to the number of cylinders, uniformly distributed over 720° of the crankshaft, is adapted to be produced and is adapted to be fed to the valve-actuating group and/or ignition device of the associated cylinders in a sequence corresponding to the ignition sequence.

32 Claims, 2 Drawing Figures

3,935,846

INSTALLATION FOR THE DIGITAL-ELECTRONIC CONTROL OF INLET, EXHAUSTION AND INJECTION VALVES AS WELL AS OF THE INJECTION IN INTERNAL COMBUSTION ENGINES

The present invention relates to an installation for the digital-electronic control of the inlet-, exhaust- and possibly injection-valves as well as of the ignition in internal combustion engines, especially in motor vehicle internal combustion engines, whereby the valves are electromagnetically actuated and the respective crankshaft position is adapted to be detected or picked up digitally.

Mechanical engine controls for changing the valve times have been known for quite some time, however, they are very expensive from a technical point of view, are limited in the selection of the input criteria and are excessively expensive for series production.

It is known in the art to undertake the fuel injection in internal combustion engines in an analog-electronic manner; similarly, electronic ignition installations are known. An electronic valve control is disclosed in the German OS No. 2,148,310 which controlled from a cam shaft, controls a monostable multivibrator. This electronic control, however, entails the disadvantage that the time constants and adjusting ranges are not adjustable at will and only in the same sense.

It is the aim of the present invention to provide an installation which enables both technically and economically in a simple manner to match optimally the timing periods of the inlet-, exhaust- and injection valves as well as of the ignition points to the respectively prevailing operating conditions and thereby to take into consideration all necessary input magnitudes.

The underlying problems are solved according to the present invention in that a fixed value memory or storage device is provided, in which at least for one cylinder and the opening and closing points of time of the inlet-, exhaust- and possibly of the injection-valves and/or of the ignition points of time are adapted to be at least partly stored and selected in the form of data sets as digital values coordinated to the respective operating conditions and corresponding to a predetermined crankshaft position, in that for each stored value of a data set, a storage or memory register is provided, to which this value is adapted to be transferred, in that for each value of a data set, a pulse comparison unit is provided in which the value stored in the memory or storage register or fixedly predetermined is adapted to be compared with the respective crankshaft position and from which, in case of agreement of the two values, a starting or commencing pulse is adapted to be produced, and in that at least for each value of a data set, a follower pulse generator is provided in which beginning with and together with the starting or commencing pulse, a number of pulses corresponding to the number of cylinders, evenly distributed over 720° of the crankshaft, is adapted to be produced and is adapted to be fed to the valve-actuating group and/or the ignition installation of the associated cylinder in a sequence corresponding to the ignition sequence.

The application of the present invention may have favorable effects on the type of construction of the engine since expensive rocker-arm controls and cam shaft-controls are obviated and since in-line, V- or opposite-piston arrangements no longer make such large differences as regards costs. The output characteristics can be matched to the use purposes, for example, to the export regulations in that simply a fixed value memory or storage device with different data sets is used. This may also be of advantage when running-in the internal combustion engine or the motor vehicle. Also, the exhaust gas quality can be better controlled over the entire rotational speed range. A further advantage, in addition to less noise from valve actuations, results from the fact that no mechanical power is taken off the engine for the valve actuation, whence the efficiency can be increased.

The particular advantage of the present invention resides in the fact that the beginning and end of the inlet-, exhaust- and injection periods of time and the ignition points of time can be displaced at will over the entire cycle of 720°, insofar as meaningful at all.

The coordination of the points of time to the crankshaft position takes place in that for four-cycle engines, a pulse transmitter or transducer is provided, which produces pulses, during the rotation of the crankshaft whereby a predetermined number of pulses is coordinated respectively to two crankshaft rotations, corresponding to 720°, and which additionally after two rotations of the crankshaft produces a synchronizing pulse corresponding to a preferred crankshaft position. The pulse transmitter may consist, for example, of an inductively detected toothed disk rotating at half the crankshaft rotational speed, which during one rotation produces four times a number of pulses coordinated to a crankshaft rotation of 180° and a synchronizing pulse. The synchronizing pulse takes place, for example, at the upper dead-center position OT of the piston in the first cylinder prior to the suction stroke.

For the further processing of this pulse, provision is made according to the present invention in that a crankshaft pulse counter is provided which consists of a pulse counter with a counter capacity corresponding to a number of pulses of 180° crankshaft rotation and of a sector counter connected thereto having a counter capacity corresponding to the number of the 180°-sectors per operating cycle and whose counter cycle commences with the synchronizing pulse. The crankshaft position, depending on the number of pulses per 180°, can be accurately determined therewith.

Additionally, provision is made according to the present invention that for each value of a data set, a follower pulse generator is provided which consists of a follower pulse counter with a counter capacity corresponding to a number of pulses of 720°, divided by the number of cylinders and with a distributor counter connected thereto having a counter capacity corresponding to the number of cylinders and whose counter cycle begins with the associated starting pulse.

Of course, it would also be possible to store one data set for each cylinder and to get along without follower pulse generators, however, this would multiply the expenditures in storage capacity, storage registers, and pulse comparison units by a factor corresponding to the number of cylinders.

Accordingly, it is an object of the present invention to provide an installation for the digital electronic control of the inlet-, exhaust- and injection valves as well as of the ignition of internal combustion engines which avoids by simple means the aforementioned shortcomings and drawbacks encountered in the prior art.

Another object of the present invention resides in an installation for the digital-electronic control of internal combustion engines in motor vehicles which is less expensive than the prior art systems, is not as limited in the choice of input criteria and can be readily adapted for mass production.

A further object of the present invention resides in a digital-electronic control system of the type described above in which the time constants and adjusting ranges permit a greater freedom of adjustment without involving excessive technical and economic expenditures.

Still a further object of the present invention resides in an installation for the digital-electronic control of the inlet-, exhaust- and injection valves as well as of the ignition system in internal combustion engines in which the timing of these valves and of the ignition instants can be matched optimally to the prevailing operating conditions, taking into consideration all requisite input magnitudes.

Another object of the present invention resides in a control installation of the type described above which obviates the need for relatively expensive and noisy mechanical parts, such as rocker arm controls and cam shaft controls.

A further object of the present invention resides in a control system for the operating parameters of an internal combustion engine which permits easy adaptation thereof to different requirements, such as local requirements, running-in, etc.

Still another object of the present invention resides in a control system of the type described above which permits an improved control of the exhaust gas quality over the entire rotational speed range while at the same time reducing the power taken off the engine for such control.

Figure 2:
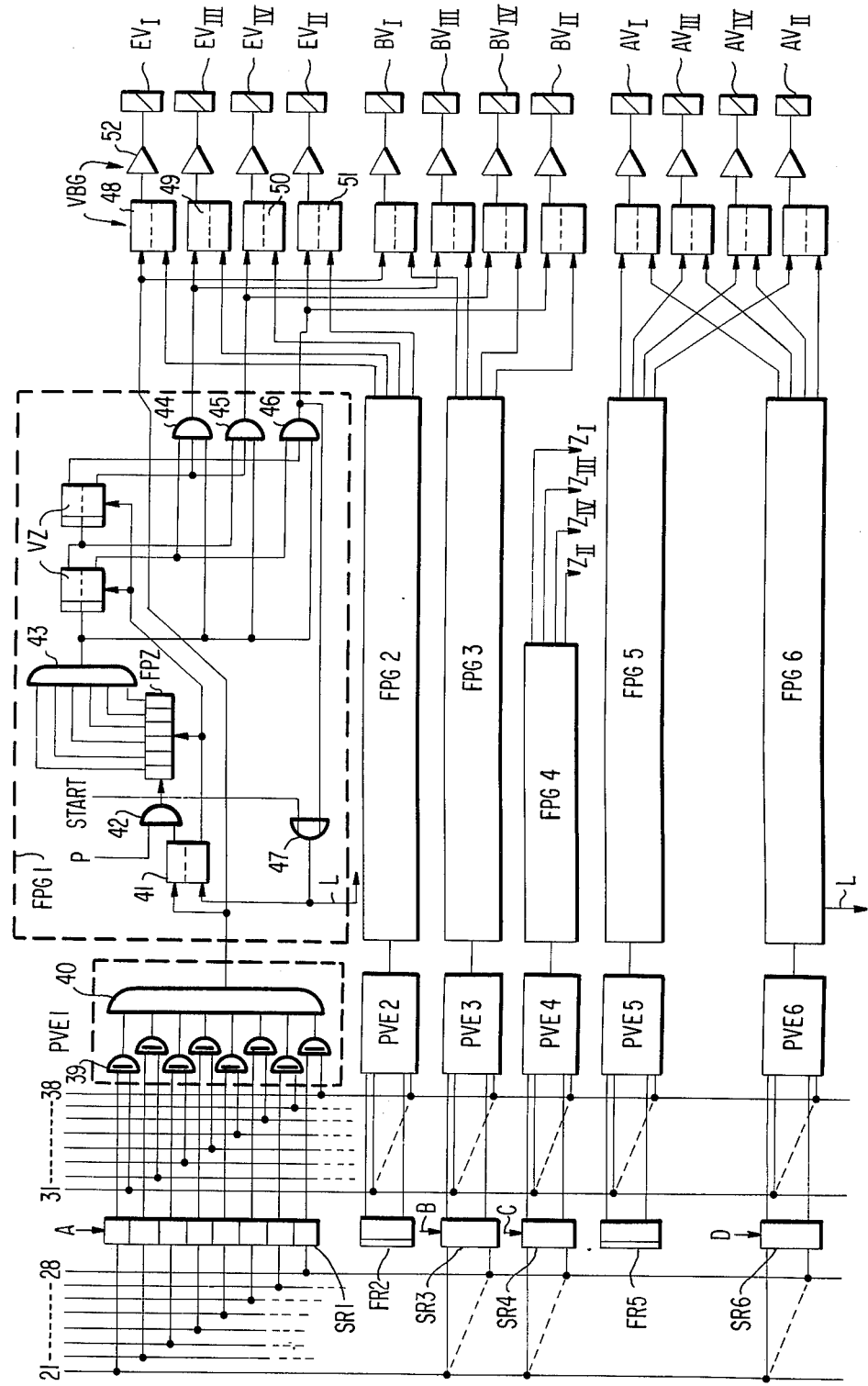

These and other objects, features, and advantages of the present invention will become more apparent from the following description when taken in connection with the accompanying drawing which shows, for purposes of illustration only, one embodiment in accordance with the present invention, and wherein:

FIG. 1 is a schematic view of a fixed value memory or storage device with a control generator and an address-forming unit, and of the pulse transmitter with the crankshaft pulse counter in the control system according to the present invention; and FIG. 2 is a schematic view of the interconnection of pulse comparison units with follower pulse generators and valve-actuating groups in the control system according to the present invention.

Referring now to the drawing wherein like reference numerals are used throughout the two views to designate like parts, the illustrated embodiment will be explained by reference to a four-cylinder engine with gasoline injection, though it is, of course, not limited to such engines. For purposes of simplification, the beginning of the fuel injection is additionally assumed to coincide with the opening point of time of the inlet valve and the closing point of time of the inlet valves as well as the opening point of time of the exhaust valves are invariably coordinated to a predetermined crankshaft position. As mentioned above, these conditions are assumed for purposes of simplification in describing the present invention though it is not limited thereto.

The fixed value memory storage device ROM illustrated in FIG. 1 is of conventional type utilizing conventional logic elements, with a small storage capacity of 256 words at 8 bits each. For one cycle (two crankshaft rotations), seven values are normally needed since only values for the first cylinder are stored, namely, three values each for the opening points of time and three values each for the closing points of time of the inlet, exhaust and injection valve as well as one for the ignition point of time or ignition instant.

With the realized simplifications only four values are still needed so that the memory or storage device may include 64 different combinations = data sets.

The position of the crankshaft within two rotations of crankshaft = one cycle = 720° is subdivided into four sectors of 180° each. For the determination of the four sectors, one requires two bits so that for the representation of the number of degrees, six bits = 64 possibilities remain, whereby an adjustment by respectively 180/64, i.e., therefore by 2.81° becomes possible.

The addressing of the fixed value memory or storage device ROM also takes place by way of eight bits $A_1$ to $A_8$, of which two, namely bits $A_1$ and $A_2$ serve as partial address for the serial search of the four words of a data set which are formed in the control generator generally designated by SG. The word address $A_3$ to $A_8$, properly speaking, is formed in the address-forming unit ABE from input magnitudes such as gas pedal position, suction pipe pressure, engine rotational speed and engine temperature; since this is done in a conventional manner utilizing known circuits forming no part of the present invention, the details thereof are not explained herein.

Consequently, 64 data sets, addressable with the address $A_3$ to $A_8$ are therefore stored in the fixed value memory or storage device ROM. Each data set consists of four words, respectively for the first cylinder;

1. Opening point of time for the inlet valve, identical with the opening point of time for the injection valve,
2. Closing point of time for the injection valve,
3. Ignition point of time, and
4. Closing point of time for the exhaust valve.

These four values are addressable one after the other by means of the partial address $A_1$, $A_2$. The closing point of time of the inlet valve and the opening point of time of the exhaust valve are fixedly interconnected in the circuit according to the aforementioned assumptions.

The control generator SG has the task to produce upon demand four output commands with simultaneous formation of the four partial addresses. It consists of an OR-element 1, of an RS-flip-flop 2, of an astable multivibrator AST, of a two-stage counter 3, 4, of the AND-elements 5 to 11 and of a differentiating element 12, all of conventional, commercially available construction.

During the starting of the engine, for example, when turning on the ignition, a pulse "start" is produced which sets the RS flip-flop 2 by way of the OR-element 1 and simultaneously brings all of the counters and flip-flops connected in the entire circuit into the starting position, which is only indicated in part. As a result of the setting of the RS-flip-flop 2, the astable multivibrator AST is released or freed which commences immediately with a pulse rise and produces pulses to the following counter 3, 4 as counter pulses and to the fixed value memory or storage device ROM as output commands AB. The output of the astable multivibrator AST and the counter outputs are now interconnected by way of AND-element 5 to 10 in such a manner that with the first output command AB the partial address and the command A, with the second output command, the partial address 2 and the command B, etc. up to the partial address 4 and the command D are produced. At the instant at which the counter 3, 4 again reaches the value zero, the RS-flip-flop 2 is brought into the reset position by way of the AND-element 11 and the differentiating element 12 and therewith the astable multivibrator AST is blocked up to the setting of the RS flip-flop 2. With the application of AB and the respective entire address $A_1$ to $A_8$, the content coordinated to this address is simultaneously given out by the fixed value memory or storage device ROM.

The pulse transmitter or transducer generally designated by reference characters IG consists of a disk 13 rotating at half the rotational speed of the crankshaft, on which are arranged along its circumference 256 index marks 15 corresponding to 4 × 180 in steps of 2.81° crankshaft rotation each and an index mark 14 along a smaller radius. During the rotation of the disk 13, 256 pulses P are produced by a transmitter or transducer 16 per rotation and one synchronizing pulse S by a transmitter or transducer 17. The pulses P and the synchronizing pulse S are fed to the crankshaft pulse counter KWPZ which consists of an OR-element 29, of an RS-flip-flop 18, of two AND-elements 19 and 20, of a six digit pulse counter PZ and of a two digit sector counter SZ, all again of conventional construction. When turning on the ignition, the "start" pulse causes the RS flip-flop 18 to go into its reset position and the two counters PZ and SZ to go into their zero position by way of the OR-element 29.

As a result thereof, the pulses P are blocked at the AND-element 19 for such length of time until the first synchronizing pulse S sets the RS flip-flop 18 and releases or opens up the AND-element 19. Thus, the counting operation commences at the defined crankshaft position. After respectively 64 pulses, the counter capacity of counter PZ is exhausted, it flips over again to zero and thereby transmits a pulse to the sector counter SZ. Normally, this takes place directly, however, it is indicated by the AND-element 20 how it would take place with non-exhaustion of the counter capacity. After a full rotation of the disk 13, both counters PZ and SZ again are at zero. In order to prevent an asynchronous condition, the counters PZ and SZ are also set to zero by each synchronizing pulse S by way of the OR-element 29.

The stored values are transferred by way of the outputs 21 to 28 of the fixed memory or storage device ROM to the circuit according to FIG. 2 and the respective crankshaft position is transferred into the circuit according to FIG. 2 by way of the outputs 31 to 38 of the counters PZ and SZ of the crankshaft pulse counter KWPZ. In FIG. 2, the eight outputs 21 to 28 of the fixed value memory or storage device ROM are connected with the inputs of four storage registers $SR_1$, $SR_3$, $SR_4$ and $SR_6$. The command lines A to D of FIG. 1 are connected with the corresponding inputs for the inscription commands of these storage registers so that Command A can reach the command input of $SR_1$,
Command B can reach the command input of $SR_3$,
Command C can reach the command input of $SR_4$, and
Command D can reach the command input of $SR_6$.

A value coming from the memory or storage device is applied to the inputs of all storage registers SR but is transmitted only to that storage register which simultaneously also receives an inscription command. Thus, the four values of a data set are transferred sequentially to the four storage or memory registers with the commands A to D of the control generator SG.

Two fixed registers $FR_2$ and $FR_5$ are provided for the two values which are fixedly interconnected in the circuit, which consists each of eight lines which are connected corresponding to the value to be represented with one or the other terminal of a voltage source.

The outputs of each register lead to the inputs of a pulse comparison unit PVE, in which they are compared bit by bit with the associated outputs of the crankshaft pulse counter for equivalence and which produces a commencing pulse when simultaneously all values to be compared with each other coincide, i.e., when the instantaneous crankshaft position agrees with the stored value.

In the pulse comparison unit $PVE_1$ surrounded in dash line, this is schematically indicated in such a manner that the outputs to be compared lead to eight equivalence elements 39 of conventional type having two inputs each, whose outputs lead to the eight inputs of an AND-element 40. The other pulse comparison units $PVE_2$ to $PVE_6$ are identical with this circuit.

The commencing pulse of each pulse comparison unit $PVE_1$ to $PVE_6$ is fed to a follower pulse generator $FPG_1$ to $FPG_6$ connected to the respective output thereof. The follower pulse generator $FPG_1$ consists of an RS flip-flop 41, of a follower pulse counter FPZ, of a two-stage distributor counter VZ, of five AND-elements 42 to 46 and of an OR-element 47, all again of conventional construction. The follower pulse generators have the task to produce for each type of pulse (injection beginning, injection point of time, etc.), beginning with the commencing pulse, four pulses mutually displaced by 180° of crankshaft rotation—one for each cylinder—and to feed the same to the actuating groups of the coordinated cylinders at the correct point of time. When turning on the ignition, the pulse "start" is transmitted by way of the OR-element 47 and sets the RS flip-flop 41 into its reset position, whereby the AND-element 42 blocks. The first commencing pulse supplied by the pulse comparison unit $PVE_1$ sets the RS flip-flop 41 and therewith opens the AND-element 42 for the pulses P coming from the transmitter or transducer 16 of the pulse transmitter IG.

Simultaneously therewith, it reaches the setting input of the RS flip-flop 48 of the valve-actuating group VBG of the inlet valve $EV_1$ of the first cylinder. All of the RS flip-flops of all valve actuating groups which are disposed one below the other, were earlier brought into the reset position by the pulse "start" which is not illustrated since this is achieved in a conventional manner.

The pulses P reach the six-digit follower pulse counters FPZ by way of the AND-element 42 opened by the commencing pulse and thus cause the same to count up. After 64 pulses, the follower pulse counter FPZ again flips over to zero. The outputs of the six stages of the follower pulse counter FPZ are so connected with an AND-element 43 that the output thereof produces a signal in the last counter position prior to the flipping over, which is so connected with the outputs of the following two-stage distributor counter VZ of conventional type by way of three AND-elements 44 to 46 that it produces in the position "zero" of the distributor counter VZ, a pulse at the output of AND-element 44, in the position "1", a pulse at the output of AND-element 45 and in the position "2", a pulse at the output of AND-element 46. This corresponds to the function of a ring counter.

Overall, the follower pulse generator $FPG_1$ sequentially transmits for each operating cycle four pulses displaced by 180° crankshaft rotation one after the other at the four outputs thereof to the inputs of the four RS flip-flops 48 to 51 which are set thereby and which energize by way of the line amplifiers 52 connected in the outputs thereof, the relay windings for the valves EV. The indices thereof indicate the number of the cylinders which are connected to the line amplifiers 52 in a sequence corresponding to the ignition sequence, in the instant case in the following sequence:

I — III — IV — II

The last of these four pulses at the output of the AND-element 46 is also conducted by way of the OR-element 47 to the reset input of the RS flip-flop 41 and as a result thereof sets the follower pulse generator into the blocking position until the next commencing pulse appears.

The remaining follower pulse generators $FPG_2$ to $FPG_6$ are identical in construction with the follower pulse generator $FPG_1$.

After the termination of a cycle, a read-out command L is given to the OR-element 1 in FIG. 1 by the follower pulse generator which produces the last pulse of the cycle, which has as a consequence the inscription of a new data set from the fixed value memory or storage device ROM into the storage or memory registers SR.

In FIG. 2, the read-out command L is produced by the follower pulse generator $FPG_6$. The place where this command is taken off in the circuit of FIG. 2 is indicated by L * at the follower pulse generator $FPG_1$.

The following pulses which are displaced in time as indicated appear at the outputs of the follower pulse generators:

$FPG_1$: opening point of time of the inlet valves EV
opening point of time of the injection valves BV
$FPG_2$: closing point of time of the inlet valves EV
$FPG_3$: closing point of time of the injection valves BV
$FPG_4$: ignition points of time Z
$FPG_5$: opening point of time of the exhaust valves AV
$FPG_6$: closing point of time of the exhaust valves AV.

The outputs of the follower pulse generators which produce opening points of time are connected with the setting inputs and those which produce closing points of time are connected with the reset inputs of the coordinated RS flip-flops and the corresponding valve is always opened at the time and for such length of time, as long as the RS flip-flop is set.

A new data set is given out for each cycle—two rotations of crankshaft—corresponding to the respectively outstanding address $A_3$ to $A_8$ so that the engine characteristics are variable at will.

For the sake of better explanation, some circuit details which appear superfluous were included and which may be dispensed with in the practical construction of the installation.

The example designed for four-cylinder engines can be readily modified without any great enlargements also for six and eight cylinder engines or for engines with other numbers of cylinders, ignition sequences and/or types of operation. Similarly, a larger number of pulses per rotation of crankshaft as well as a larger memory or storage capacity may be of advantage.

Furthermore, the system may be equipped with conventional safety devices. For example, a safety circuit of any conventional type may be provided which detects any malfunctioning or disturbance in the system and causes the injection valves to block so as to avoid improper operation of the engine.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A control installation for the digital-electronic control of at least one of valve means and ignition means in internal combustion engines, in which the valve means are electromagnetically actuated and the respective crankshaft position is adapted to be determined digitally, characterized in that it comprises control circuit means including a fixed value storage means in which at least for one cylinder of the engine, at least one of opening and closing points of time of the valve means, on the one hand, and ignition points of time, on the other, are operable to be at least partially stored and selected as digital values coordinated to the respective operating conditions and corresponding to a predetermined crankshaft position in the form of data sets, storage register means for each stored value of a data set operatively connected to the fixed value storage means; the stored value being transferable to the storage register means, pulse comparison means for each value of a data set operatively connected to the storage register means, in which a value is adapted to be compared with the respective crankshaft position and which is operable to produce a commencing pulse in case of agreement of the two values, and a follower pulse generator means at least for each value of a data set operatively connected with the respective comparison means in which, beginning and together with the commencing pulse, a number of pulses corresponding to the number of cylinders is produced, uniformly distributed over a predetermined number of degrees of the crankshaft, and means for feeding the last-mentioned pulses to at least one of valve actuating means and ignition means of the associated cylinder in a sequence corresponding to the ignition sequence.

2. An installation according to claim 1, characterized in that the valves include inlet and outlet valves means of the engine.

3. An installation according to claim 2, characterized in that the valve means include inlet, exhaust and injection valve means.

4. An installation according to claim 3, characterized in that the fixed value storage means is operable to store and select at least in part the opening and closing points of time of said valve means as digital values in the form of data sets.

5. An installation according to claim 4, characterized in that the fixed value storage means is operable to at least partly store and select the ignition points of time as digital values in the form of data sets.

6. An installation according to claim 5, characterized in that the pulse comparison means is operable to compare the values stored in the storage register means with the respective crankshaft position.

7. An installation according to claim 5, characterized in that the pulse comparison means is operable to compare fixedly predetermined values with the respective crankshaft position.

8. An installation according to claim 5, characterized in that the number of pulses produced by the follower pulse generator means is fed to valve-actuating means of the associated cylinder.

9. An installation according to claim 8, characterized in that the number of pulses produced by the follower pulse generator means is fed to the ignition means of the associated cylinder in a sequence corresponding to the ignition sequence.

10. An installation according to claim 9, characterized in that a pulse transmitter means is provided which produces pulses during the rotation of the crankshaft, a predetermined number of pulses being coordinated respectively to two crankshaft rotations corresponding to 720°, and which additionally produces after each two rotations of the crankshaft, a synchronizing pulse corresponding to a preferred crankshaft position.

11. An installation according to claim 10, characterized in that the installation is for a four-cycle engine.

12. An installation according to claim 10, characterized in that a crankshaft pulse counter means is provided in the circuit means, which includes a pulse counter means having a counting capacity corresponding to a number of pulses of 180° crankshaft rotation, and a sector counter means operatively connected with the pulse counter means having a counter capacity corresponding to the number of the 180° sectors per operating cycle and whose counting cycle begins with the synchronizing pulse.

13. An installation according to claim 12, characterized in that one follower pulse generator means is provided in the circuit means for each value of a data set which includes a follower pulse counter means having a counting capacity corresponding to a number of pulses of 720°, divided by the number of cylinders, and a distributor counter means operatively connected therewith and having a counting capacity corresponding to the number of cylinders and whose counting cycle begins with the associated commencing pulse.

14. An installation according to claim 13, characterized in that for each valve means an actuating means is provided which includes a reset flip-flop means operable to be set by the associated opening pulse and to be reset by the associated closing pulse, and amplifier means operatively connected with the output of the flip-flop means which is operable to control the electromagnetic valve means.

15. An installation according to claim 14, characterized in that with a sequential value output from the fixed value storage means, a control generator means with an astable multivibrator means is provided in the circuit means which upon appearance of a read-out command, immediately commences with a pulse rise and transmits a number of pulses corresponding to the number of the stored values of a data set to a counter means for forming the partial addresses.

16. An installation according to claim 15, characterized in that a means is provided which during the starting of the engine produces a start pulse which is operable to set all counter and multivibrator means into the starting position.

17. An installation according to claim 16, characterized in that a safety circuit means is provided which in case of an occurring disturbance, closes the injection valve means.

18. An installation according to claim 17, characterized in that the installation is for a four-cycle engine.

19. An installation according to claim 1, characterized in that the fixed value storage means is operable to at least partly store and select the ignition points of time as digital values in the form of data sets.

20. An installation according to claim 1, characterized in that the fixed value storage means is operable to store and select at least in part the opening and closing points of time of said valve means as digital values in the form of data sets.

21. An installation according to claim 1, characterized in that the pulse comparison means is operable to compare the values stored in the storage register means with the respective crankshaft position.

22. An installation according to claim 1, characterized in that the pulse comparison means is operable to compare fixedly predetermined values with the respective crankshaft position.

23. An installation according to claim 1, characterized in that a pulse transmitter means is provided which produces pulses during the rotation of the crankshaft, a predetermined number of pulses being coordinated respectively to two crankshaft rotations corresponding to 720°, and which additionally produces after each two rotations of the crankshaft, a synchronizing pulse corresponding to a preferred crankshaft position.

24. An installation according to claim 23, characterized in that the installation is for a four-cycle engine.

25. An installation according to claim 1, characterized in that a crankshaft pulse counter means is provided in the circuit means, which includes a pulse counter means having a counting capacity corresponding to a number of pulses of 180° crankshaft rotation, and a sector counter means operatively connected with the pulse counter means having a counter capacity corresponding to the number of the 180° sectors per operating cycle and whose counting cycle begins with the synchronizing pulse.

26. An installation according to claim 25, characterized in that one follower pulse generator means is provided in the circuit means for each value of a data set which includes a follower pulse counter means having a counting capacity corresponding to a number of pulses of 720°, divided by the number of cylinders, and a distributor counter means operatively connected therewith and having a counting capacity corresponding to the number of cylinders and whose counting cycle begins with the associated commencing pulse.

27. An installation according to claim 1, characterized in that for each valve means an actuating means is provided which includes a reset flip-flop means operable to be set by the associated opening pulse and to be reset by the associated closing pulse, and amplifier means operatively connected with the output of the flip-flop means which is operable to control the electromagnetic valve means.

28. An installation according to claim 1, characterized in that with a sequential value output from the fixed value storage means, a control generator means with an astable multivibrator means is provided in the circuit means which upon appearance of a read-out command, immediately commences with a pulse rise and transmits a number of pulses corresponding to the number of the stored values of a data set to a counter means for forming the partial addresses.

29. An installation according to claim 1, characterized in that a means is provided which during the starting of the engine produces a start pulse which is operable to set all counter and multivibrator means into the starting position.

30. An installation according to claim 1, characterized in that a safety circuit means is provided which in case of an occurring disturbance, closes the injection valve means.

31. An installation according to claim 1, wherein said control circuit means includes selecting means responsive to the operating conditions of the engine for selecting in the form of data sets digital values from said fixed value storage means corresponding to predetermined crank shaft positions.

32. An installation according to claim 31, wherein said pulse comparison means compares the selected value of the data set corresponding to a predetermined crankshaft position with continuously changing values of crankshaft position and produces a commencing pulse in case of agreement of the two values.

* * * * *